United States Patent Office 2,971,455
Patented Feb. 14, 1961

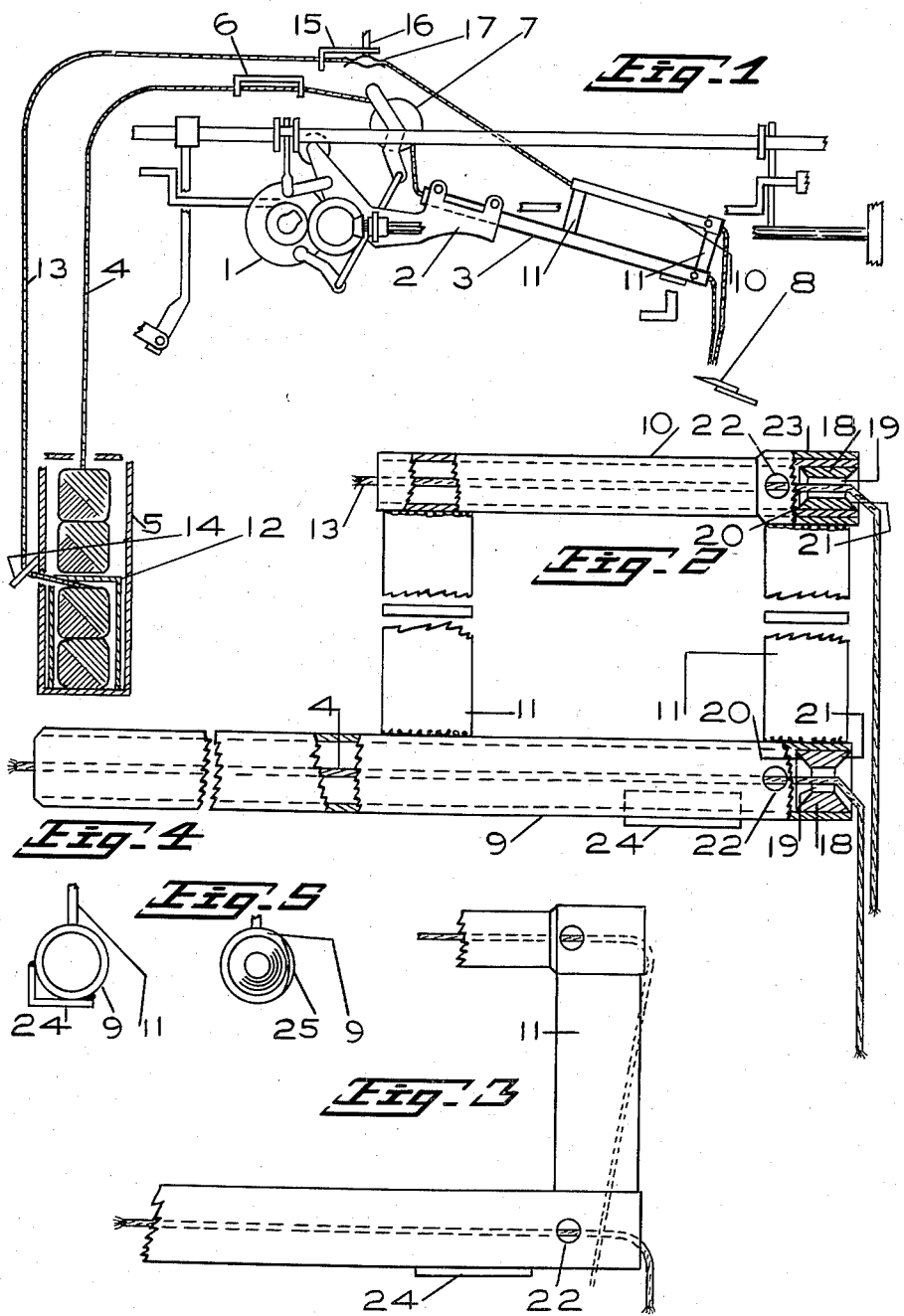

2,971,455
TWINE HOLDING ARM FOR BALERS

Robert Edgar Wade and William Cecil Wade, both of Consort, Alberta, Canada

Filed Dec. 17, 1958, Ser. No. 780,996

1 Claim. (Cl. 100—5)

This invention relates to holding arms for string or twine used in binding bales in a travelling baler of a type in which hay or straw is rolled and spirally wound with the twine.

In balers of this character twine from a ball is fed through an arm that is mechanically moved from a depending position in which the twine first engages the bale to a horizontal position, and during this movement of the arm the twine is wound spirally around the bale and at the conclusion of the movement the twine is cut and the bale discharged.

The twine winding and discharging of the bale requires about nine seconds to complete, during which a conveyer feeding material to the bale forming unit must stop, and if at the same time the baler continues its forward movement and continues picking up hay or straw a considerable amount of this may accumulate on the conveyer.

The present invention is designed to effect improvements in the twine holding arm by which parallel lengths of twine are wound around the bale spaced apart and by speeding up the movement of the arm across the bale the time required for binding the bale may be greatly reduced.

In the drawings, illustrating a preferred embodiment of the invention,

Fig. 1 is a side view showing the improved twine holding arm and including the mounting of the arm by which it is actuated, and further including a double twine holder, the latter being shown in section and parts of the mounting and associated parts being shown broken away.

Fig. 2 is an enlarged side view of the twine holding arm taken by itself, shown partly in section and partly broken away, and including the twine.

Fig. 3 is an enlarged side view of a fragment of the twine holding arm, illustrating how the upper twine may slide back along the lower arm.

Fig. 4 shows a rear end view of the lower arm, including the wear plate and a fragment of the connecting link plate.

Fig. 5 shows a front end view of the lower arm, with fragment of the connecting link plate.

Having reference to the drawings, at 1 is generally indicated mechanism by which a twine holding arm may be mounted to be moved in binding a bale, this mechanism including an arm 2 in which a twine holding arm, such as the arm 3, is mounted. This arm 3 corresponds to the arm at present in use, but with some modifications that are the subject matter of the present application, as will later be pointed out. The arm 3 is tubular and through it twine 4 is fed from a ball holding can 5, the twine passing through a guide 6 and a tension disc guide 7. In use such an arm passes from an initial depending position to an approximate horizontal position, during which movement the twine is spirally wound on a rotating bale, all of which is in accordance with devices of this character as at present in use.

In the present invention the function of the twine holding arm 3 is maintained, but with certain changes made in the arm. These consist in replacing the arm 3 by an arm 9, shown separately in Figures 2 and 3, corresponding to the arm 3 and on which an upper auxiliary arm 10 of tubular material is mounted by means of link plates 11. The upper arm is shorter than and spaced above the lower arm 9 with the outlets from the arms 9 and 10 aligned.

The lower arm 9 carries the twine 4 from the ball holding can 5, and for the purpose of the present invention this can is increased in height and within it is a smaller can 12 with an outlet for twine 13 that passes through a suitable opening in the can 5 and a guide 14 from where it is carried over suitable guide means in the baler to a further guide arm 15 attached to the baler hood, not shown, by a depending arm 16 and between the plates of a tension disc guide 17 corresponding to the guide 7. From there the twine passes through the bore of the shorter upper arm 10 and has its end portion hanging downward for engagement of the bale.

The arms 9 and 10 have each inserted in the outlet ends a plug 18 with bore 19 for the twine. The plugs are firmly engaged in the arms and have tapered ends 20 and 21, the ends 20 facilitating threading the twine through the plugs and the ends 21 forming inclines for the twine leaving the plugs. To further assist in threading twine through the plugs a hole 22 is provided in each arm to the rear of the plugs. The upper arm 10 includes a reinforcing band 23 to which the link plate 11 is attached, the plates being welded to the arms.

On the under side of the lower arm 9 is an angular wear plate 24 for protection as the arm hits its stopper in the baler. The lower arm also has its inner end tapered at 25, Figure 5, this being provided for when the upper twine slides back along the lower arm, as in Figure 3, the taper facilitating the twine sliding off again.

In the use of the double twine holding arm, with twine threaded through both arms and the arms depending at the starting end for binding the bale, the two twine ends are spaced apart the width separating the two arms. As the arms are moved across the bale until they reach the approximate horizontal position as in Figure 1 the spacing between the two binding twines decreases until at the conclusion of the binding of the bale they come together and are severed by the knife 8, which latter is as at present in use. By speeding up the mechanism and increasing the rate of movement of the twine holding arms across the bale the time required for binding the bale may be reduced to nearly a half that needed for tying the bale with a single twine feeding arm, thus avoiding a heavy accumulation of hay or straw on the baler conveyer.

Having thus described our invention what we claim and wish to secure by Letters Patent is:

In a traveling baler of a character in which hay is rolled into a bale and the bale rotated to be wound with twine, said baler having an arm mounted to be mechanically moved from a depending to a horizontal position in spirally winding twine on a bale and a primary tubular arm carried by the mechanically moved arm and through which the twine is fed, a secondary tubular arm, means mounting the secondary arm on the primary arms spaced from and parallel therewith and with the outlets from the two arms vertically aligned when the arms are horizontal, and twine feeding means in the baler delivering through the secondary tubular arm.

References Cited in the file of this patent

UNITED STATES PATENTS

| | | |
|---|---|---|
| 2,410,159 | Harrer et al. | Oct. 29, 1946 |
| 2,468,641 | Scranton et al. | Apr. 26, 1949 |
| 2,829,585 | Varvel | Apr. 8, 1958 |